US008858828B2

(12) United States Patent
Klein et al.

(10) Patent No.: US 8,858,828 B2
(45) Date of Patent: Oct. 14, 2014

(54) USE OF 2-(3-AMINOPROPOXY)ETHAN-1-OL AS AN ABSORBENT TO REMOVE ACIDIC GASES

(75) Inventors: Howard P. Klein, Austin, TX (US); Robert A. Grigsby, Jr., Spring, TX (US); Jingjun Zhou, The Woodlands, TX (US); Patrick Holub, Spring, TX (US); Attila Gaspar, Petfurdo (HU); Zsolt Gaspar, Petfurdo (HU)

(73) Assignee: Huntsman Petrochemical LLC, The Woodlands, TX (US)

( * ) Notice: Subject to any disclaimer, the term of this patent is extended or adjusted under 35 U.S.C. 154(b) by 465 days.

(21) Appl. No.: 13/275,357

(22) Filed: Oct. 18, 2011

(65) Prior Publication Data

US 2012/0269707 A1 Oct. 25, 2012

Related U.S. Application Data

(60) Provisional application No. 61/407,988, filed on Oct. 29, 2010, provisional application No. 61/473,892, filed on Apr. 11, 2011.

(51) Int. Cl.
| | | |
|---|---|---|
| C09K 3/00 | (2006.01) | |
| C07C 215/08 | (2006.01) | |
| C07C 215/12 | (2006.01) | |
| C07D 241/04 | (2006.01) | |
| C07D 295/03 | (2006.01) | |
| B01D 53/14 | (2006.01) | |

(52) U.S. Cl.
CPC ...... *B01D 53/1462* (2013.01); *B01D 2252/502* (2013.01); *B01D 2252/20478* (2013.01); *B01D 2252/2025* (2013.01); *Y02C 10/06* (2013.01); *B01D 53/1493* (2013.01); *B01D 2257/504* (2013.01); *B01D 2252/20405* (2013.01); *B01D 2252/20447* (2013.01); *B01D 2252/504* (2013.01); *B01D 2252/202* (2013.01); *B01D 2256/24* (2013.01); *B01D 2257/304* (2013.01); *B01D 2258/0283* (2013.01)
USPC ........ 252/184; 252/190; 423/228; 423/242.4; 423/242.7; 564/503; 564/508; 544/358

(58) Field of Classification Search
None
See application file for complete search history.

(56) References Cited

U.S. PATENT DOCUMENTS

| | | | |
|---|---|---|---|
| 2,712,978 | A | 7/1955 | Blohm et al. |
| 3,953,586 | A | 4/1976 | Tanimura |
| 4,705,528 | A * | 11/1987 | Baxter et al. ................ 8/641 |
| 5,081,305 | A | 1/1992 | Carr et al. |
| 5,618,506 | A | 4/1997 | Suzuki et al. |
| 5,861,051 | A | 1/1999 | Critchfield et al. |
| 6,337,059 | B1 | 1/2002 | Schubert et al. |
| 7,374,734 | B2 | 5/2008 | Grossman et al. |
| 7,666,813 | B2 | 2/2010 | Hoefer et al. |
| 7,749,309 | B2 | 7/2010 | Asprion et al. |
| 7,758,673 | B2 | 7/2010 | Brok et al. |
| 2006/0045830 | A1 | 3/2006 | Streitberger et al. |
| 2006/0178259 | A1 | 8/2006 | Schubert et al. |
| 2009/0013872 | A1 | 1/2009 | Cadours et al. |
| 2009/0151318 | A1 | 6/2009 | Handagama et al. |

* cited by examiner

*Primary Examiner* — Stanley Silverman
*Assistant Examiner* — Daniel Berns
(74) *Attorney, Agent, or Firm* — Huntsman International LLC

(57) ABSTRACT

The present disclosure provides a scrubbing composition containing an aqueous solution of 2-(3-aminopropoxy)ethan-1-ol. The scrubbing composition is especially suited for use in removing acid gases, such as carbon dioxide and hydrogen sulfide, from gas streams.

22 Claims, 3 Drawing Sheets

USE OF 2-(3-AMINOPROPOXY)ETHAN-1-OL AS AN ABSORBENT TO REMOVE ACIDIC GASES

CROSS-REFERENCE TO RELATED APPLICATION

Not Applicable.

STATEMENT REGARDING FEDERALLY SPONSORED RESEARCH OR DEVELOPMENT

Not Applicable.

FIELD OF INVENTION

This disclosure relates to an improved scrubbing composition containing an aqueous solution of 2-(3-aminopropoxy) ethan-1-ol useful for the separation of acid gases from fluid streams.

BACKGROUND OF THE INVENTION

In numerous processes in the chemical industry, fluid streams occur containing acid gases, for example $CO_2$, $H_2S$, $SO_2$, $CS_2$, HCN, COS or mercaptans, as impurities. These fluid streams can be, for example, gas streams (such as natural gas, synthesis gas or heavy oil or heavy residues, refinery gas, or reaction gas resulting from the partial oxidation of organic materials, for example coal or petroleum) or liquid or liquefied hydrocarbon streams (such as liquefied petroleum gas "LPG") or natural gas liquids ("NGL").

Before these fluids can be transported or further processed, the acid gas content of the fluid must be significantly decreased. For example, $CO_2$ must be removed from natural gas since a high $CO_2$ concentration decreases the heating value of the gas. In addition, $CO_2$, in combination with water entrained in a fluid stream can lead to corrosion on pipelines and fittings.

The removal of sulfur compounds from these fluid streams is also of particular importance. For example, the content of sulfur compounds of natural gas must be reduced by suitable treatment measures directly at the natural gas source, since the sulfur compounds can also form corrosive acids in the water entrained in the natural gas. Furthermore, numerous sulfur compounds are foul smelling, even at low concentrations, and can be toxic.

Processes have been developed for removing acid gas constituents from fluid streams such as hydrocarbon gases, LPG, or NGL. In most processes, the fluid mixture containing the acid gas constituents is brought into contact with absorbent solvents in a gas scrubber or a liquid/liquid extraction stage.

On an industrial scale there are primarily two categories of absorbent solvents depending on the mechanism to absorb the acidic components: chemical solvents and physical solvents. Each solvent has its own advantages and disadvantages as to features such as loading capacity, kinetics, regenerability, selectivity, stability, corrosivity, heat/cooling requirements, etc.

Physical solvents which have proven to be industrially suitable are cyclo-tetramethylenesulfone and its derivatives, aliphatic acid amides, N-methylpyrrolidone, N-alkylated pyrrolidones and the corresponding piperidones, methanol, ethanol, and mixtures of dialkylethers of polyethylene glycols.

Chemical solvents which have proven to be industrially useful are primary, secondary and/or tertiary amines derived from alkanolamines. The most frequently used amines are derived from ethanolamine, such as monoethanolamine (MEA), diethanolamine (DEA), triethanolamine (TEA), diisopropanolamine (DIPA), monomethyl ethanolamine (MMEA), piperazine and methyldiethanolamine (MDEA).

A particularly effective absorbent solution is one that contains 2-(2-aminoethoxy)ethanol. However, 2-(2-aminoethoxyethanol) can form into morpholine which is removed in the stripper section of a gas treating system. Thus, this compound must either be replaced or regenerated periodically to retain efficiency. Accordingly, it is highly desirable to develop alternative absorbent solutions which are as highly effective yet overcome the problem described above.

SUMMARY OF THE INVENTION

The present disclosure provides a scrubbing composition for the removal of acid gases from fluids which contains an aqueous solution of 2-(3-aminopropoxy)ethan-1-ol.

The present disclosure also provides a process for the removal of acid gases from fluids in which in an absorption step, a fluid stream comprising acid gas constituents is contacted with the gas treating composition, a fluid stream depleted in acid gases and a scrubbing composition enriched with acid gases being obtained.

In another aspect, there is provided a process for the separation of carbon dioxide and hydrogen sulfide from a gas stream including the steps of contacting the scrubbing composition with the gas stream wherein the scrubbing composition contains at least 3% by weight of 2-(3-aminopropoxy) ethan-1-ol.

In another aspect there is provided a gas separation process, comprising contacting a scrubbing composition containing an aqueous solution of 2-(3-aminopropoxy)ethan-1-ol with a sour gas stream under conditions such that the gas stream is sweetened and wherein the process is conducted in the absence of a reclamation step.

Finally, there is provided a gas treating concentrate from which a scrubbing composition may be prepared by simply by adding water.

DETAILED DESCRIPTION OF THE INVENTION

Figure 1:
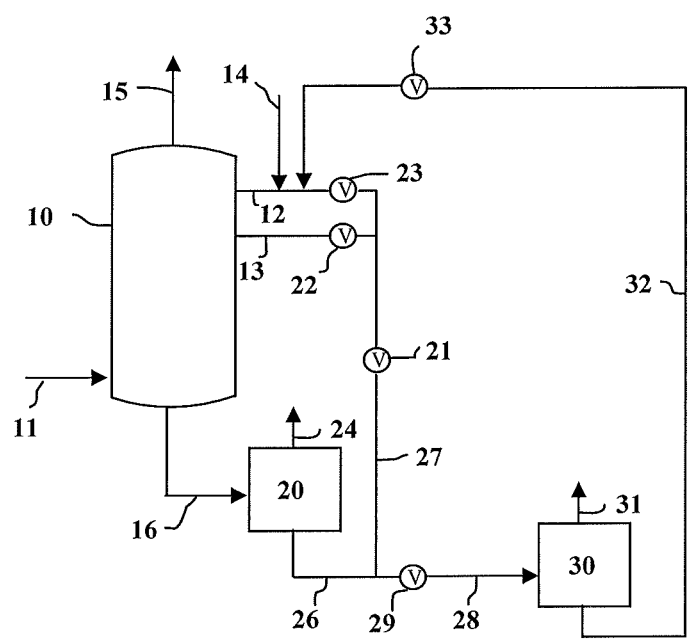
FIG. 1 shows an absorption process of the present disclosure.

The scrubbing composition of the present disclosure is an aqueous solution containing 2-(3-aminopropoxy)ethan-1-ol (EGPA) (amine component a)). The concentration of EGPA is generally at least 3% by weight, preferably at least about 20% by weight, and even more preferably at least about 40% by weight, based on the total weight of the gas treating composition. In other embodiments, the concentration of EGPA is no greater than 85% by weight, preferably no greater than 65% by weigh and even more preferably no greater than 60% by weight, based on the total weight of the gas treating composition.

The scrubbing composition may also comprise one or more additional amines suitable for the abstraction of acid gases, including, but not limited to, monoethanolamine (MEA), diethanolamine (DEA), triethanolamine (TEA), diisopropanolamine (DIPA), ethanol, 2-(2-aminoethoxy, 3-methylaminopropylamine and methyldiethanolamine (MDEA), piperazine, methyl piperazine, and any other promoters, etc. (amine component b)). If present, the amine component b) may be present in an amount of from about 0.5% to about 80% by weight, preferably from about 1% to about 60% by weight, based on the total weight of the gas treating composition.

Generally, the total amine content in the scrubbing composition is at least about 3% by weight, preferably at least 20% by weight, and even more preferably at least about 40% by weight based on the total weight of the gas treating composition. In another embodiment, the total amine content in the scrubbing composition is no greater than about 85% by weight, preferably no greater than 65% by weight, and even more preferably no greater than about 60% by weight based on the total weight of the gas treating composition. In yet another embodiment, the total amine content in the scrubbing composition is in the range from about 3% to about 85%, by weight, preferably from about 20% to about 65% by weight, more preferably from about 40% to about 60% by weight, and in some instances about 50% by weight based on the total weight of the gas treating composition. If amine component b) is present, the proportion of EGPA (amine component a)) is then decreased, so that the total amine content remains in the amounts specified above.

It is common for the user of amine gas treating compositions to acquire the amine of choice, and dilute with water to a percentage of choice. The extent of dilution of the aqueous solution of this disclosure is not critical, and can vary on a variety of factors, such as type of scrubbing unit, temperature, pressure, composition of acid gas, etc. Thus, there is provided in another embodiment a process for preparing the scrubbing composition comprising forming a gas treating concentrate comprising EGPA and diluting the concentrate with water to form the gas treating composition.

The scrubbing composition may also comprise physical solvents, including but not limited to sulfolane, N-methylpyrrolidone or N-alkylated piperidones. If present, the physical solvents may range in an amount from about 5% by weight to about 60% by weight, based on the total weight of the gas treating composition.

The scrubbing composition may also comprise additives, such as corrosion inhibitors, defoamers, enzymes, etc. Generally, the amount of such additives range from about 0.01% by weight to about 5% by weight, based on the total weight of the gas treating composition.

In one embodiment, the scrubbing composition may be used for treating fluids, in particular, gas streams of all types to remove acid gases. The fluids may comprise acid gases such as $CO_2$, $H_2S$, COS, $SO_3$, $SO_2$, $CS_2$, mercaptans, and HCN. Many of these may be removed from the gas stream. Fluids comprising the acid gases may be gases, such as natural gas, synthesis gas, refinery gas including refinery coker off gas, refinery fluid catalytic cracker off gas, refinery hydrogen units, gasified coal, circulation gas, landfill gases and combustion gases. The fluids may also be liquids which are essentially immiscible with the gas treating composition, such as liquefied petroleum gas (LPG) or natural gas liquids (NGL). The fluids may also, in addition to one or more of the acid gases, comprise further inert gas constituents which are not absorbed by the scrubbing composition in significant quantities. Examples are oxygen, hydrogen, nitrogen and volatile hydrocarbons, such as $C_1$-$C_8$ hydrocarbons. The inventive scrubbing composition is particularly effective for removing $CO_2$ and $H_2S$ from gas streams. In some embodiments, the acid gas constituents may range from 0.01 vol % up to 70 or even 80 vol % of the total gas stream. For example, carbon dioxide may range from about 0.01-45 mol % and hydrogen sulfide may range from about 0.001-45 mol % (all % based on the total gas stream).

Thus, the scrubbing composition of the present disclosure is suitable in processes for removing acid gases from gases which are not themselves absorbed by the gas treating composition, and for extracting acid gases from liquids which are essentially immiscible with the gas treating composition. The process sequence of a gas scrubbing is described in principle below. The process may also be applied to liquids without problem by those skilled in the art. The regeneration of the scrubbing composition is identical in the case of liquids and gases.

The starting gas stream (untreated gas) rich in acid gas constituents is contacted with the scrubbing composition in an absorber in an absorption step, as a result of which the acid gas constituents are at least partially scrubbed out.

A scrubbing apparatus such as those used in conventional gas scrubbing processes may act as the absorber. Examples of scrubbing apparatus including one or more columns containing internals such as random packed column, structured packed columns tray columns, membrane contractors, radial-stream scrubbers, jet scrubbers, venturi scurbbers, and rotary spray scrubbers. The gas stream may either be contacted with the scrubbing composition in a countercurrent flow or co-current flow, preferably countercurrent flow. In addition, the gas stream may enter the column at any point depending on the flow configuration of the apparatus. The gas treating solution may enter the apparatus at one or more locations.

The temperatures and pressures at which the scrubbing composition contacts the gas stream to be treated may vary. In one embodiment, the temperatures are in a range from about −20° C. to 180° C. In another embodiment, the pressure is in a range from about atmospheric to about 2500 psi. The flow rates at which the scrubbing composition and gas stream enter the scrubbing apparatus can vary widely depending on the make up of such streams, temperature, pressure, desired extent of acid gas removal and the like. Such flow rates are known to those skilled in the art.

In some embodiments, the process can comprise one or more sequential absorption steps. The absorption may be carried out in a plurality of sequential part-steps, the untreated gas comprising the acid gas constituents being contacted in each of the part-steps in each case with one substream of the gas treating composition. The scrubbing composition with which the untreated gas is contacted can already be partly loaded with acid gases, that is to say it can be, for example, a scrubbing composition which has been recirculated to the first absorption step from a following absorption step, or a partially regenerated gas treating composition.

The acid gas constituents may be liberated in a regeneration step in a customary manner from the scrubbing composition loaded with the acid gas constituents, a regenerated scrubbing composition obtained. In the regeneration step the acid gas content of the scrubbing composition is decreased and the resultant regenerated scrubbing composition is preferably then recirculated to the absorption step.

Generally, the regeneration step may comprise at least one depressurization of the acid gas containing composition from a higher pressure. The depressurization may take place, for example, by means of a throttle valve and/or by an expansion turbine. In addition, the gas treating solution may be heated to raise the temperature to assist in the removal of the acid gas components.

The acid gas constituents may be liberated in the regeneration step, for example, in a desorption unit or expansion column, for example, a vertical or horizontal flash container, a stream stripping column, or a countercurrent flow column possessing internals. In some embodiments, a plurality of expansion of units or columns can be connected in series in which regeneration is performed at differing pressures. For example, in a pre-expansion unit or column, regeneration can be carried out at high pressure for example 60-100 psi and in a main unit or expansion column, at low pressure, for example atmospheric pressure to about 30 psi.

In some embodiments, the unit or column may be operated under vacuum, which may be produced, by example, a stream jet and a mechanical vacuum generation apparatus.

In FIG. 1, there is shown one embodiment of a process of this disclosure. In FIG. 1, a gas stream (sour gas) is introduced into an absorber (10) via line (11) wherein the sour gas rises countercurrent to scrubbing composition of the present disclosure which is introduced in the upper portion of absorber (10) via line (12), line (13), or both. Acid gas constituents (e.g. $CO_2$ and/or $H_2S$) are absorbed in absorber (10) and any gases that have not been absorbed exit via conduit (15). Original and make-up scrubbing composition may be introduced via line (14).

Acid gas laden scrubbing composition exits absorber (10) via a second exit conduit (16), being sent under pressure to desorption unit (20), for example, a flash unit or a steam stripping column. If only one desorption unit is employed, it is typical to use line (12) only.

In desorption unit (20), desorption occurs whereby acid gas constituents are liberated from the gas treating composition, with such liberated acid gas constituents exiting via line (24). Regenerated scrubbing composition exits via line (26), and flows through line (27) and valve (21) to line (12) via open valve (23) if a second desorption unit is absent, or may flow to line (13) via open valve (22) if a second desorption unit is employed.

When further desorption is desired, all or a portion of effluent from desorption unit (20) is sent to a second desorption unit (30), for example a flash unit or steam stripping column, via open valve (29) and line (28).

In the second desorption unit (30), additional desorption of all or a portion of the first regenerated scrubbing composition is effected. Liberated acid gas constituents exit via line (31), with regenerated scrubbing composition being recycled via line (32) through valve (33) to line (12).

It should be appreciated that a variety of regeneration steps and recycling steps may be employed as shown in FIG. 1. Thus, one or two regeneration units can be employed. All or a portion of the effluent from a first regeneration unit may be sent to a second regeneration unit. Multiple injection points may thus be used to recycle treating composition to the absorption tower. It should also be appreciated that FIG. 1 depicts one arrangement of this invention, with the practice of this invention admitting to other lay-outs, configurations, multiple towers, specific pumps, valves and control features.

In addition to removing acid gas constituents, the scrubbing composition may also be used in electronic applications, for example, in cleaning circuit boards, or in metal working fluids and the like.

EXAMPLES 6400 grams of 2-(3-aminopropoxy)ethan-1-ol (EGPA) and 9600 grams of deionized water were mixed thoroughly to form a gas treating composition. 13,782 grams of the scrubbing composition was then charged to a gas treating unit containing an absorber and stripper connected together in a continuous flow. The absorber was heated to approximately 38° C. while the stripper was heated to approximately 117° C. Nitrogen gas flow was started into the unit at 11.5 liters/minute. After 2.5 hours, $CO_2$ flow was started into the unit at 2.5 liters/minute and the scrubbing composition flow was started into the unit at a rate of 0.38 lbs/minute. After approximately 4 hours, the gas treating unit had equilibrated and samples of the gas coming off the absorber were collected. The volume of gas coming in and out of the absorber was also measured. The results are shown in Table 1. Other flow rates were varied during the course of the run. These results are also shown in Table 1.

TABLE 1

| Amine | $CO_2$ in (moles) | $CO_2$ absorbed (moles) | $CO_2$ absorbed in absorber (%) | Flow rate (mole Amine per min) | Flow rate (lbs of amine solution per min) | $CO_2$/amine (mole ratio) |
|---|---|---|---|---|---|---|
| EGPA | 0.11 | 0.11 | 99.7 | 0.587 | 0.384 | 0.19 |
| EGPA | 0.11 | 0.11 | 99.8 | 0.581 | 0.380 | 0.20 |
| EGPA | 0.11 | 0.11 | 99.9 | 0.579 | 0.379 | 0.19 |
| EGPA | 0.11 | 0.11 | 99.8 | 0.579 | 0.379 | 0.19 |
| EGPA | 0.11 | 0.11 | 99.7 | 0.469 | 0.307 | 0.23 |
| EGPA | 0.11 | 0.09 | 83.2 | 0.181 | 0.118 | 0.52 |
| EGPA | 0.12 | 0.05 | 43.0 | 0.093 | 0.061 | 0.54 |
| EGPA | 0.11 | 0.05 | 42.5 | 0.091 | 0.060 | 0.52 |

The above example was repeated in a similar manner with a new sample of EGPA and the results are shown in Table 2:

TABLE 2

| Amine | $CO_2$ in (moles) | $CO_2$ absorbed (moles) | $CO_2$ absorbed in absorber (%) | Flow rate (mole Amine per min) | Flow rate (lbs of amine solution per min) | $CO_2$/amine (mole ratio) |
|---|---|---|---|---|---|---|
| EGPA | 0.11 | 0.11 | 99.8 | 0.593 | 0.389 | 0.19 |
| EGPA | 0.11 | 0.11 | 99.7 | 0.576 | 0.377 | 0.20 |
| EGPA | 0.11 | 0.11 | 99.7 | 0.594 | 0.389 | 0.19 |
| EGPA | 0.11 | 0.09 | 78.6 | 0.187 | 0.123 | 0.47 |
| EGPA | 0.12 | 0.08 | 70.8 | 0.165 | 0.108 | 0.51 |
| EGPA | 0.11 | 0.11 | 99.7 | 0.607 | 0.400 | 0.18 |
| EGPA | 0.11 | 0.11 | 99.9 | 0.593 | 0.389 | 0.19 |

A further example was performed using a mixture of ethanol, 2-(2-aminoethoxy) and water. 6000 grams of ethanol, 2-(2-aminoethoxy) and 9000 grams of deionized water were mixed thoroughly to form a comparative gas treating solution. 12,615 grams of the comparative gas treating solution was then charged to a gas treating unit containing an absorber and stripper connected together in a continuous flow. The absorber was heated to approximately 38° C. while the stripper was heated to approximately 117° C. Nitrogen gas flow as started into the unit at 11.5 liters/minute. After 2.5 hours, $CO_2$ flow was started into the unit at 2.5 liters/minute and the gas treating solution flow was started into the unit at a rate of 0.385 lbs/minute. After approximately 4 hours, the gas treating unit had equilibrated and samples of the gas coming off the absorber were collected. The volume of gas coming in and out of the absorber was also measured. The results are shown in Table 3: Other flow rates were varied during the course of the run. These results are also shown in Table 3.

TABLE 3

| Amine | $CO_2$ in (moles) | $CO_2$ absorbed (moles) | $CO_2$ absorbed in absorber (%) | Flow rate (mole Amine per min) | Flow rate (lbs of amine solution per min) | $CO_2$/amine (mole ratio) |
|---|---|---|---|---|---|---|
| ethanol, 2-(2-aminoethoxy) | 0.11 | 0.11 | 99.9 | 0.656 | 0.383 | 0.17 |
| ethanol, 2-(2-aminoethoxy) | 0.11 | 0.11 | 100 | 0.658 | 0.384 | 0.17 |
| ethanol, 2-(2-aminoethoxy) | 0.11 | 0.11 | 99.9 | 0.658 | 0.384 | 0.17 |
| ethanol, 2-(2-aminoethoxy) | 0.11 | 0.11 | 99.6 | 0.411 | 0.300 | 0.27 |
| ethanol, 2-(2-aminoethoxy) | 0.11 | 0.10 | 86.9 | 0.209 | 0.122 | 0.46 |
| ethanol, 2-(2-aminoethoxy) | 0.11 | 0.05 | 47.4 | 0.111 | 0.065 | 0.47 |

Figure 2:
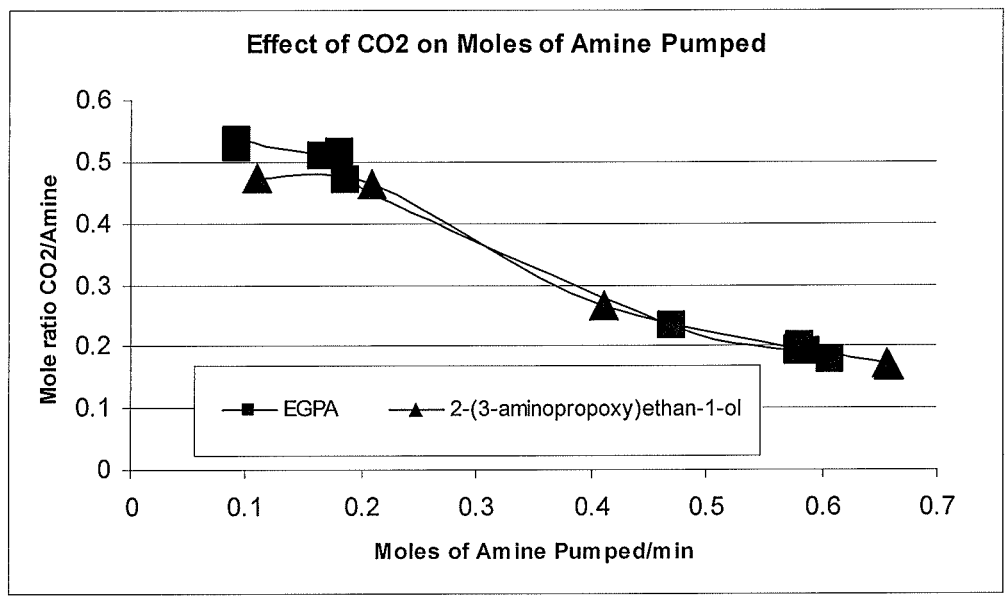
FIG. 2 shows a graph of $CO_2$ loading versus amine loading in a gas treating unit.

Depicted in FIG. 2, is a plot of the $CO_2$/amine mole ratio versus the number of moles of amine pumped into the gas treating unit per minute. As demonstrated, both amines absorb $CO_2$ in a similar manner.

Figure 3:
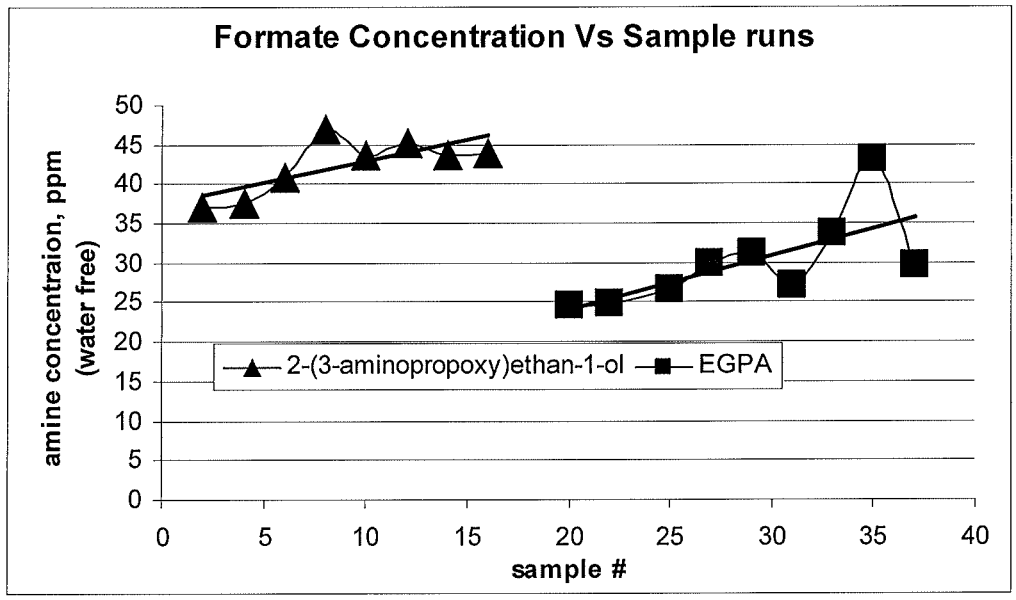
FIG. 3 shows a graph of formate build-up over time in a gas treating unit.

Furthermore, as shown in FIG. 3, formate concentration over time for the EGPA is lower than that for ethanol, 2-(2-aminoethoxy).

Figure 4:
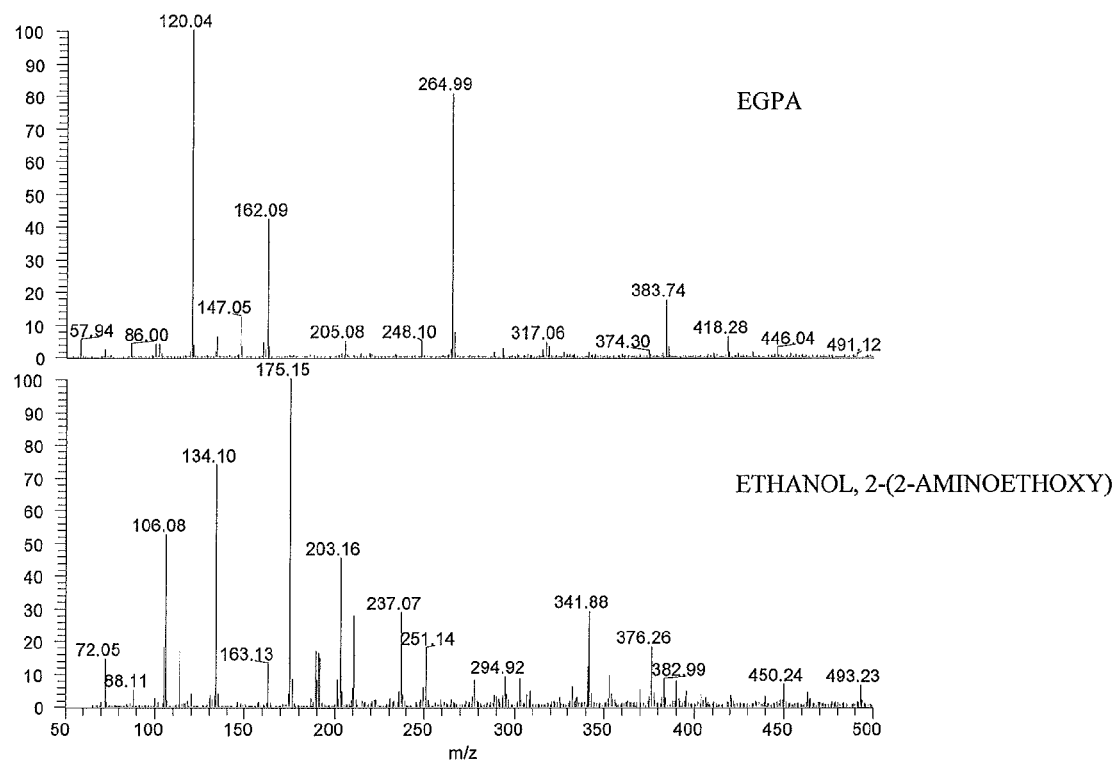
FIG. 4 shows a LC-MS-MS of samples taken during processing in a gas treating unit.

Finally, FIG. 4 depicts a LC-MS for the last sample taken from each run and shows that EGPA (top MS spectra) has less by-products formed over time during processing than ethanol, 2-(2-aminoethoxy) (bottom MS spectra).

Although making and using various embodiments of the present disclosure have been described in detail above, it should be appreciated that the present disclosure provides many applicable inventive concepts that can be embodied in a wide variety of specific contexts. The specific embodiments discussed herein are merely illustrative of specific ways to make and use the disclosure, and do not delimit the scope of the disclosure.

What is claimed is:

1. A scrubbing composition comprising:
    an aqueous solution of 2-(3-aminopropoxy)ethan-1-ol; and
    one or more additional amines selected from monoethanol amine (MEA), diethanolamine (DEA), triethanolamine (TEA), diisopropanolamine (DIPA), ethanol, 2-(2-aminoethoxy), 3-methylaminopropylamine, monomethyl ethanolamine (MMEA), piperazine, methyl piperazine and methyldiethanolamine (MDEA).

2. The scrubbing composition of claim 1 wherein the total amine content is at least about 3% by weight, based on the total weight of the scrubbing composition.

3. The scrubbing composition of claim 1, wherein the total amine content is no greater than about 85% by weight, based on the total weight of the scrubbing composition.

4. The scrubbing composition of claim 1, wherein the one or more additional amines are present in an amount of from about 0.5% by weight to about 80% by weight, based on the total weight of the scrubbing composition.

5. The scrubbing composition of claim 1, wherein the one or more additional amines are present in an amount of from about 1% by weight to about 60% by weight, based on the total weight of the scrubbing composition.

6. The scrubbing composition of claim 1, wherein the total amine content is from about 3% by weight to about 85% by weight, based on the total weight of the scrubbing composition.

7. The scrubbing composition of claim 1, wherein the total amine content is from about 20% by weight to about 65% by weight, based on the total weight of the scrubbing composition.

8. The scrubbing composition of claim 1, wherein the total amine content is from about 40% by weight to about 60% by weight, based on the total weight of the scrubbing composition.

9. The scrubbing composition of claim 1, further comprising one or more physical solvents.

10. The scrubbing composition of claim 9, wherein the one or more physical solvents are selected from sulfolane, N-methylpyrrolidone, or N-alkylated piperidones.

11. The scrubbing composition of claim 9, wherein the one or more physical solvents are present in an amount of from about 5% by weight to about 60% by weight, based on the total weight of the scrubbing composition.

12. The scrubbing composition of claim 1, further comprising one or more additives.

13. The scrubbing composition of claim 12, wherein the one or more additives are selected from corrosion inhibitors, defoamers, and enzymes.

14. The scrubbing composition of claim 12, wherein the one or more additives are present in an amount of from about 0.01% by weight to about 5% by weight, based on the total weight of the scrubbing composition.

15. The scrubbing composition of claim 1, wherein the one or more additional amines is monoethanol amine (MEA).

16. The scrubbing composition of claim 1, wherein the one or more additional amines is diethanolamine (DEA).

17. The scrubbing composition of claim 1, wherein the one or more additional amines is triethanolamine (TEA).

18. The scrubbing composition of claim 1, wherein the one or more additional amines is diisopropanolamine (DIPA).

19. The scrubbing composition of claim 1, wherein the one or more additional amines is methyldiethanolamine (MDEA).

20. The scrubbing composition of claim 1, wherein the one or more additional amines is monomethyl ethanolamine (MMEA).

21. The scrubbing composition of claim 1, wherein the one or more additional amines is piperazine.

22. A scrubbing composition prepared by diluting a gas treating concentrate comprising 2-(3-aminopropoxy)ethan-1-ol and one or more additional amines with water, wherein the one or more additional amines are selected from monoethanol amine (MEA), diethanolamine (DEA), triethanolamine (TEA), diisopropanolamine (DIPA), ethanol, 2-(2-aminoethoxy), 3-methylaminopropylamine, monomethyl ethanolamine (MMEA), piperazine, methyl piperazine and methyldiethanolamine (MDEA).

* * * * *